US008894122B2

(12) United States Patent
Gilbert et al.

(10) Patent No.: US 8,894,122 B2
(45) Date of Patent: Nov. 25, 2014

(54) INTERIOR DECK SYSTEM FOR A TRAILER OR OTHER STORAGE CONTAINER

(71) Applicant: Wabash National, L.P., Lafayette, IN (US)

(72) Inventors: Danny L. Gilbert, Monticello, IN (US); James B. Brown, Crystal Lake, IL (US); Todd Blaising, Mansfield, OH (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/049,914

(22) Filed: Oct. 9, 2013

(65) Prior Publication Data
US 2014/0110960 A1    Apr. 24, 2014

Related U.S. Application Data

(60) Provisional application No. 61/716,106, filed on Oct. 19, 2012.

(51) Int. Cl.
*B62D 25/20*    (2006.01)
*B60P 1/00*    (2006.01)

(52) U.S. Cl.
CPC .............. *B62D 25/2054* (2013.01); *B60P 1/00* (2013.01)
USPC ..................................................... 296/24.44

(58) Field of Classification Search
USPC ................. 296/24.44; 16/356–361, 366, 368; 105/372, 375; 49/383; 14/69.5
See application file for complete search history.

(56) References Cited

U.S. PATENT DOCUMENTS

| | | | | |
|---|---|---|---|---|
| 3,370,882 A | * | 2/1968 | Morgan | 296/24.44 |
| 3,875,871 A | * | 4/1975 | Thornton et al. | 105/375 |
| 3,897,971 A | * | 8/1975 | Evans | 296/24.44 |
| 3,911,832 A | * | 10/1975 | Vandergriff | 105/372 |
| 4,281,870 A | * | 8/1981 | Ehrlich et al. | 296/24.44 |
| 5,042,863 A | * | 8/1991 | Fraga | 296/24.44 |
| 6,585,306 B1 | * | 7/2003 | Smith et al. | 296/24.44 |
| 7,104,895 B2 | * | 9/2006 | Hickey | 472/89 |
| 7,293,813 B2 | * | 11/2007 | Squyres et al. | 296/24.44 |
| 7,370,899 B2 | * | 5/2008 | Powers et al. | 296/24.4 |
| 7,396,066 B2 | * | 7/2008 | Houston | 296/69 |
| 2006/0076791 A1 | * | 4/2006 | Powers et al. | 296/24.44 |
| 2008/0012372 A1 | * | 1/2008 | Squyres et al. | 296/24.44 |

OTHER PUBLICATIONS

Photographs of first interior deck system of a FedEx Ground trailer. Photographs taken by Wabash National Corporation on Sep. 6, 2012 (4 pages).
Photographs of a second interior deck system of a FedEx Ground trailer. Photographs taken by Wabash National Corporation on Sep. 6, 2012 (4 pages).

* cited by examiner

*Primary Examiner* — Lori Lyjak

(57) ABSTRACT

An interior deck system of a trailer includes a side rail configured to be coupled to an inner surface of a sidewall of the trailer and a panel coupled to the side rail. The panel is movable between a generally vertical, stowed position and a generally horizontal, use position. The interior deck system further includes a hinge assembly including a hinge butt coupled to the side rail and a hinge strap coupled to the panel.

19 Claims, 7 Drawing Sheets

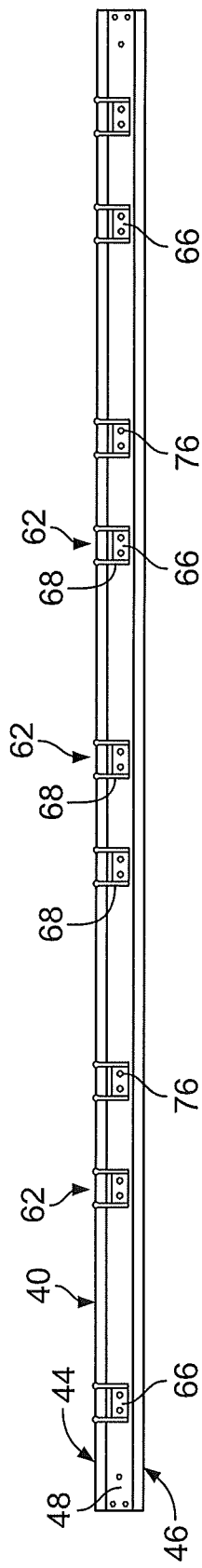
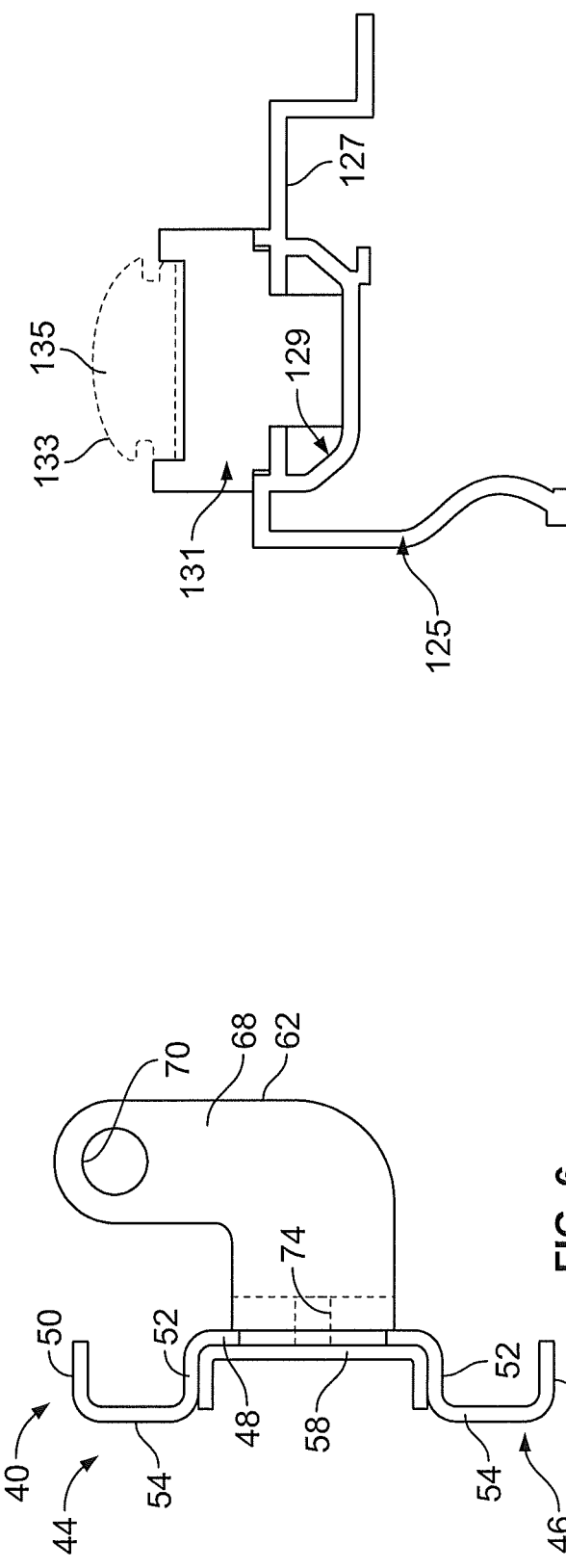
FIG. 5
FIG. 6
FIG. 7

INTERIOR DECK SYSTEM FOR A TRAILER OR OTHER STORAGE CONTAINER

This application claims priority under 35 U.S.C. §119(e) to U.S. Provisional Patent Application Ser. No. 61/716,106 filed Oct. 19, 2012 entitled INTERIOR DECK SYSTEM FOR A TRAILER OR OTHER STORAGE CONTAINER, the entirety of which is hereby incorporated by reference herein.

FIELD OF THE INVENTION

The present invention relates generally to an interior deck system for a trailer, truck body, or other storage container. In particular, the present invention relates to an interior deck system that is movable between use and stowed positions.

BACKGROUND

Truck trailers may include a deck system within the storage container of the trailer. Such a deck system oftentimes includes one or more panels which cooperate to create a platform spaced-apart from both the floor assembly and the roof assembly of the trailer in order to create an additional surface on which cargo may be placed. Oftentimes, the panels of the deck system are able to be moved to a stowed position when not needed and/or when loading and unloading the cargo within the storage container that is located below the deck system.

SUMMARY

The present invention may comprise one or more of the features recited in the attached claims, and/or one or more of the following features and combinations thereof.

According to one aspect of the present disclosure, an interior deck system of a trailer includes a side rail configured to be coupled to an inner surface of a sidewall of the trailer and a panel coupled to the side rail. The panel is movable between a generally vertical, stowed position and a generally horizontal, use position. The interior deck system further includes a hinge assembly including a hinge butt portion coupled to the side rail and a hinge strap portion coupled to the panel.

In one illustrative embodiment, the hinge strap portion may be coupled to a bottom surface of the panel.

In another illustrative embodiment, the hinge assembly may define a pivot axis about which the panel may be pivoted between the stowed and use positions. Further, the pivot axis may be positioned below a bottom surface of the panel when the panel is in the use position.

In yet another illustrative embodiment, the hinge butt portion may include (i) a body coupled to a vertical surface of the side rail and (ii) first and second arms coupled to each end of the body such that the first and second arms may be spaced-apart from each other. Illustratively, a top surface of each of the first and second arms may be vertically spaced-apart from a top surface of the body. Further illustratively, the body may be generally C-shaped when viewed from above such that the first and second arms are spaced apart from the vertical surface of the side rail. An outer edge of the panel may be positioned between (i) the first and second arms of the hinge butt portion and (ii) the sidewall of the trailer when the panel is in the stowed position. Further, the panel may be spaced-apart from the side rail when the panel is in the use position.

In still another illustrative embodiment, the panel may include first and second side edges. Further, at least one of the side edges may include a cut-out portion formed therein.

In yet another illustrative embodiment, the deck system may also include a locking assembly configured to secure the panel in the generally vertical, stowed position. Illustratively, the locking assembly may include a magnet configured to be coupled to an interior surface of a sidewall of the trailer. Further illustratively, at least a portion of an upper surface of the panel may include a ferrous metal such that the portion of the upper surface of the panel may be retained by the magnet when the panel is in the stowed position. Illustratively, the magnet may be configured to be spaced-apart from and positioned above the side rail.

In still another illustrative embodiment, the panel may include a plastic core and metal outer skins coupled to the plastic core. Illustratively, the panel may be approximately 0.5 inches thick.

In yet another illustrative embodiment, the panel may be a first panel and the deck assembly may also include a second panel coupled to the side rail and positioned adjacent the first panel. Illustratively, the second panel may also be movable between the generally vertical, stowed position and the generally horizontal, use position.

According to another aspect of the present disclosure, an interior deck system positioned within an interior storage area of a trailer includes a side rail configured to be coupled to an inner surface of a sidewall of the trailer, and first and second panels each hingedly coupled to the side rail. Each of the first and second panels is movable between a generally vertical, stowed position and a generally horizontal, use position. Further, the first and second panels each include first and second side edges such that the first side edge of the first panel is adjacent to and engaged with the second side edge of the second panel to define a generally continuous upper surface of the interior deck system when the first and second panels are each in the generally horizontal, use position. Finally, the first side edge of the first panel includes a first cut-out portion formed therein to define an aperture between the first and second panels when the first and second panels are positioned parallel and adjacent each other in order to allow a user to grab ahold of either the first side edge of the first panel or the second side edge of the second panel.

In one illustrative embodiment, the second side edge of the second panel may also include a second cut-out portion formed therein. Illustratively, the first and second cut-out portions may be adjacent each other.

In another illustrative embodiment, the deck assembly may also include a first hinge assembly including a hinge butt portion coupled to the side rail and a hinge strap portion coupled to the first panel. Illustratively, the first hinge assembly may define a pivot axis about which the first panel is pivoted between the stowed and use positions. Further, the pivot axis may be positioned below a bottom surface of the first panel when the first panel is in the use position.

In yet another illustrative embodiment, the hinge butt portion may include (i) a body coupled to a vertical surface of the side rail and (ii) first and second arms coupled to each end of the body such that the first and second arms are spaced-apart from each other. Illustratively, a top surface of each of the first and second arms may be vertically spaced-apart from a top surface of the body. Further illustratively, the body may be generally C-shaped when viewed from above such that the first and second arms are spaced apart from the vertical surface of the side rail. An outer edge of the first panel may be positioned between (i) the first and second arms of the hinge butt portion, and (ii) the sidewall of the trailer when the first panel is in the stowed position. Further, the first and second panels may be spaced-apart from the side rail when the first and second panels are in the use position.

In still another illustrative embodiment, the deck assembly may also include a locking assembly configured to secure the panel in the generally vertical, stowed position. Illustratively, the locking assembly may include a magnet configured to be coupled to an interior surface of a sidewall of the trailer. Further, at least a portion of an upper surface of the panel may include a ferrous metal such that the portion of the upper surface of one of the first and second panels is retained by the magnet when the one of the first and second panels is in the stowed position. The magnet may be configured to be spaced-apart from and positioned above the side rail.

In yet another illustrative embodiment, the first and second panels may each include a plastic core and metal outer skins coupled to the plastic core.

According to another aspect of the present disclosure, an interior deck system positioned within an interior storage area of a trailer includes a side rail configured to be coupled to an inner surface of a sidewall of the trailer and a panel coupled to the side rail. The panel is movable between a generally vertical, stowed position and a generally horizontal, use position. The deck system further includes a hinge assembly coupled to the panel and the side rail in order to allow the panel to pivot about a pivot axis between the stowed and use positions. The deck system further includes a vertical channel between an innermost surface of the side rail and the pivot axis to allow debris which may accumulate on a top surface of the panel when the panel is in the use position to fall through the channel to a location below the side rail when then panel is in the stowed position.

In one illustrative embodiment, a bottom surface of the panel may be positioned between the pivot axis and the side rail when the panel is in the stowed position.

In another illustrative embodiment, the hinge assembly may include (i) a hinge butt portion coupled to the side rail and having an uppermost surface positioned below a bottom surface of the panel, and (ii) a hinge strap portion coupled to the bottom surface of the panel such that the pivot axis of the hinge assembly is positioned below the bottom surface of the panel when the panel is in the use position. Further illustratively, the hinge butt portion may include (i) a body coupled to a vertical surface of the side rail and (ii) first and second arms coupled to each end of the body such that the first and second arms are spaced-apart from each other and from the vertical surface of side rail to which the body is coupled.

In yet another illustrative embodiment, the deck assembly may also include a locking assembly configured to secure the panel in the generally vertical, stowed position. Illustratively, the locking assembly may include a magnet configured to be coupled to an interior surface of a sidewall of the trailer. Further, at least a portion of an upper surface of the panel may include a ferrous metal such that the portion of the upper surface of the panel is retained by the magnet when the panel is in the stowed position.

In still another illustrative embodiment, the panel may be a first panel, and the deck assembly may also include a second panel coupled to the side rail and positioned adjacent the first panel. Illustratively, the second panel may also be movable between the generally vertical, stowed position and the generally horizontal, use position. Further, an aperture may be located between adjacent panels to allow a user grab a side edge of the first and second panel when the first and second panels are in the stowed position.

According to yet another aspect of the present disclosure, an interior deck system positioned within an interior storage area of a trailer includes a side rail configured to be coupled to an inner surface of a sidewall of the trailer and a panel coupled to the side rail. The panel is movable between a generally vertical, stowed position and a generally horizontal, use position. The deck system further includes a hinge assembly including a hinge butt portion coupled to the side rail and a hinge strap portion coupled to the panel. The hinge assembly defines a pivot axis about which the panel is pivoted between the stowed and use positions. Illustratively, the pivot axis is positioned below a bottom surface of the panel when the panel is in the use position.

BRIEF DESCRIPTION OF THE DRAWINGS

FIG. 5 is a side view of a side rail of the deck system showing a plurality of hinge butt portions coupled thereto.

FIG. 6 is an end view of the side rail of FIG. 5 showing a hinge butt portion coupled thereto.

FIG. 7 is an end view of a deck rail, deck bumper support, and deck bumper of a conveyor system associated with the deck system of the present disclosure.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage containers, as well as refrigerated and un-refrigerated trailers, truck bodies, or other storage containers. Accordingly, those skilled in the art will appreciate that the present invention may be implemented in a number of different applications and embodiments and is not specifically limited in its application to the particular embodiments depicted herein.

Figure 1:
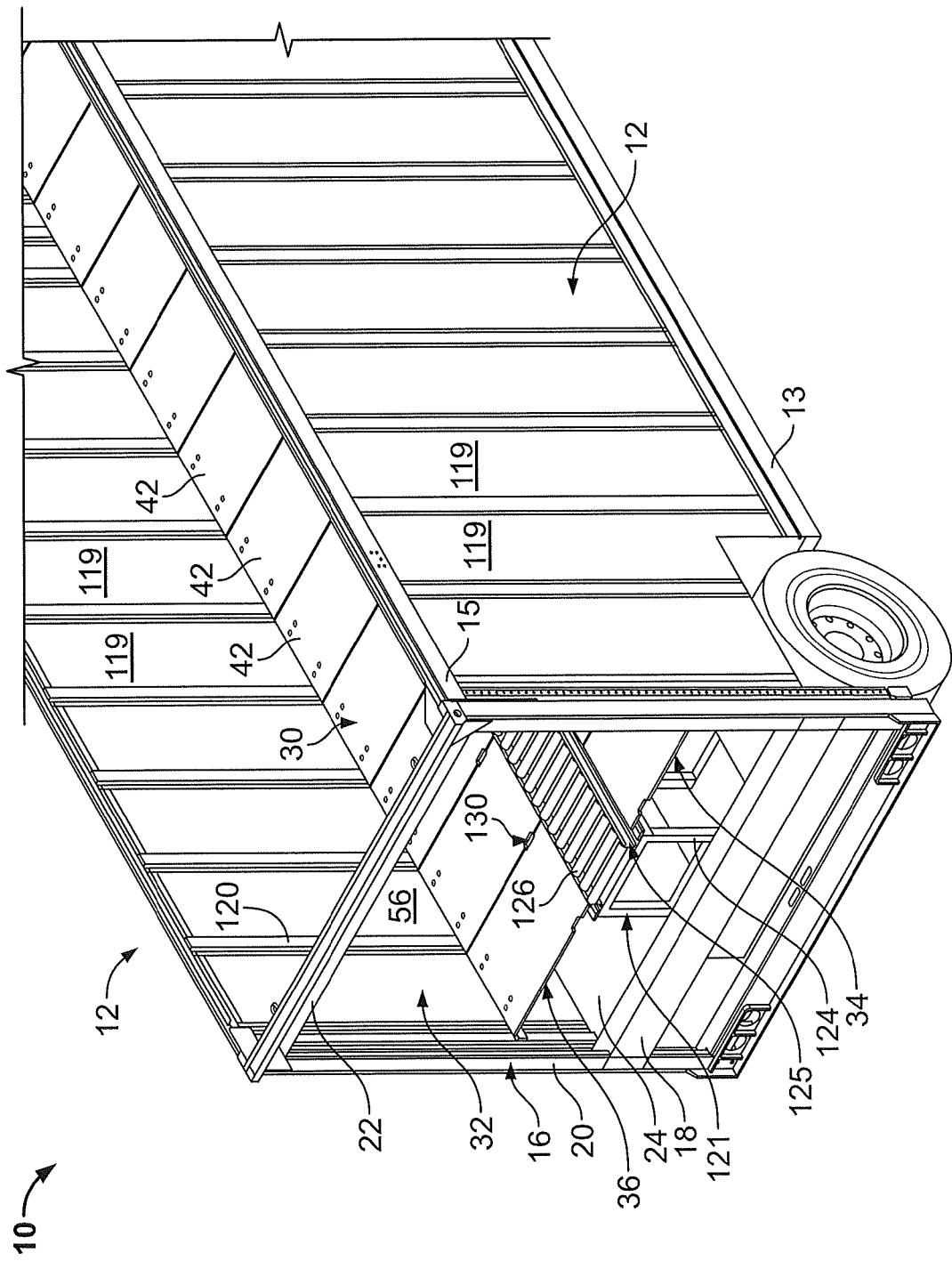
FIG. 1 is a rear perspective view of a portion of a trailer showing a deck system of the present disclosure in a generally horizontal, use position.
Figure 2:
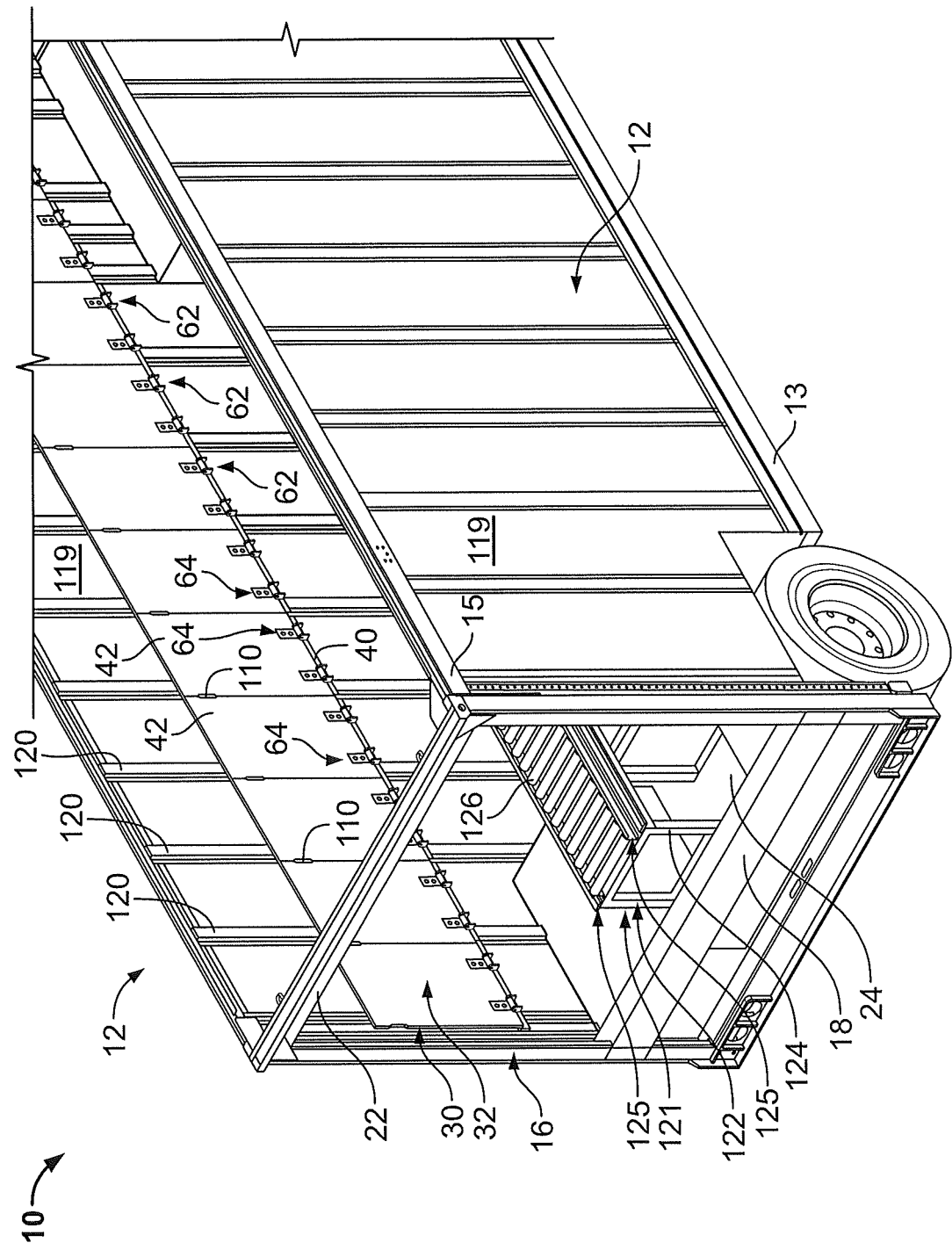
FIG. 2 is a rear perspective of the portion of the trailer of FIG. 1 showing the deck system in a generally vertical, stowed position.

Looking to FIGS. 1 and 2, one illustrative embodiment of a conventional trailer 10 is shown. As is discussed in greater detail below, the trailer 10 includes an interior deck system 30 within an interior storage area 32 of the trailer 10. The deck system 30 operates to provide an additional horizontal surface within the trailer 10 on which cargo may be stowed during transport. In the illustrated embodiment, the trailer 10 further includes a pair of opposing sidewalls 12 that extend the length of the trailer 10 and that are each attached at a front end thereof to a front frame assembly (not shown). Each sidewall 12 is affixed at a bottom end thereof to a side or base rail 13, and at a top end to a top rail 15. Rear ends of each sidewall 12 are attached to a rear frame 16 of the trailer 10 that includes a bottom frame member or sill 18, and a pair of side frame members 20 extending upwardly from opposites ends of the sill 18 and connected at their opposite ends to a top frame member 22.

The trailer 10 may also include a rear door (not shown) such as an overhead door or a pair of swing doors, for example. The trailer 10 further includes a roof assembly (not shown) coupled to the sidewalls 12, the rear frame 16, and the front frame assembly. A floor assembly 24 of the trailer 10 is similarly coupled to the sidewalls 12, the front frame assembly, and the rear frame 16. Illustratively, the floor assembly 24 includes a plurality of extruded aluminum floor boards. However, it should be understood that the trailer 10 may include any suitable floor assembly made from any suitable material or materials including other metals, wood, and/or polymers. The floor assembly 24, the roof assembly, the front frame assembly, and the rear frame 16 cooperate to define the inner storage area 32 of the trailer 10 within which cargo may be transported and within which the deck system 30 is located.

As noted above, the trailer 10 includes the deck system 30 within the inner storage area 32 of the trailer 10. Illustratively, as is discussed in greater detail below, the deck system 30 is movable between a generally horizontal, use position shown in FIG. 1 and a generally vertical, stowed position shown in FIG. 2. In the use position, the deck system 30 provides an additional horizontal surface spaced-apart from the floor assembly 24 and the roof assembly upon which cargo may be stowed. As shown in FIG. 1, the deck system 30 is positioned approximately one third of the height of the sidewalls 12 of the trailer 10 up from the floor assembly 24. It should be understood, however, that the deck system 30 may be positioned at any suitable height along the sidewalls 12. Furthermore, it should be understood that one or more deck systems, such as the deck system 30, may be provided at different heights within the storage area 32 of the trailer 10.

Illustratively, the trailer 10 includes a right deck system 30 coupled to the right sidewall 12 of the trailer 10 and a left deck system 30 coupled to the left sidewall 12 of the trailer (when viewed from behind or above). The trailer 10 further includes a cargo conveyor system 121 generally centrally located between the right and left deck systems 30. As is discussed in greater detail below, the cargo conveyor system 121 is coupled to the floor assembly 24 and is engaged with each deck system 30 when each deck system 30 is in the horizontal, use position. Illustratively, the right and left deck systems 30 are identical to each other; as such, only one deck system 30 is described herein.

The deck system 30 includes a side rail 40, shown in FIG. 5, and a plurality of platforms, or panels 42, pivotably coupled to the side rail 40. The side rail 40 is coupled to the inner surface of the sidewall 12 of the trailer 10 and extends generally horizontally along a length of the trailer 10. As shown in FIG. 1, the side rail 40 extends along the entire length of the trailer 10. However, it is within the scope of this disclosure to provide a side rail which extends only partially along the length of the trailer 10. As is discussed below, the side rail 40 may include multiple side rail portions which are coupled together to define the side rail 40.

As shown in FIG. 6, the side rail includes a top U-shaped portion 44, a bottom U-shaped portion 46, and an intermediate, vertical portion 48. Illustratively, each U-shaped portion 44, 46 includes outer and inner horizontal members 50, 52, and a vertical member 54. The vertical member 54 of each U-shaped portion 44, 46 is configured to engage the inner surface 56 of the sidewall 12 of the trailer 10. In particular, the vertical members 54 are coupled to the vertical posts 120 of the sidewall 12. One or more rivets (not shown) or other suitable mechanical fasteners such as screws, nails, nuts and bolts, etc., may be used to couple the vertical members 45 to the sidewall 12 in order to fixedly secure the side rail 40 to the sidewall 12. It should also be understood that the side rail 40 may be coupled to the sidewall 12 through the use of an adhesive in lieu of or in addition to the mechanical fasteners.

Figure 10:
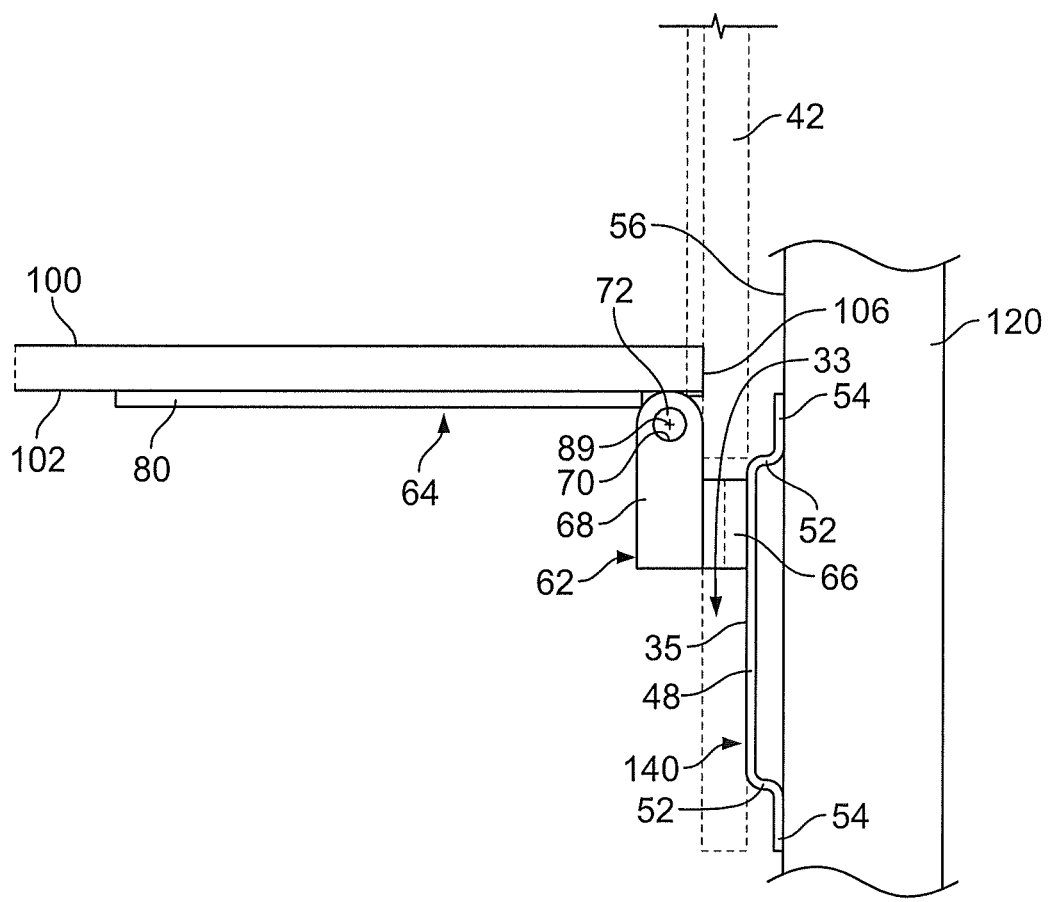
FIG. 10 is an end view of the deck system of the present disclosure showing the panel in the horizontal, use position and showing, in phantom, the panel moved to the vertical, stowed position.

While the illustrative side rail 40 is shown in FIG. 6, an alternative side rail, such as the side rail 140 shown in FIG. 10, may also be provided. Illustratively, the side rail 140 of FIG. 10 is similar to the side rail 40 of FIGS. 5 and 6, but does not includes the outer, horizontal members 50 of the side rail 40. Illustratively, the side rails 40, 140 are each made of steel; however, other suitable materials including other metals, metal alloys, plastics, and/or wood may be used as well.

Illustratively, the intermediate, vertical member 48 is horizontally spaced-apart from the vertical members 54 of the U-shaped members 44, 46 such that the intermediate, vertical member 48 is positioned inwardly (i.e, further into the interior of the storage space 32 of the trailer 10) than the vertical members 54. The space between the vertical member 48 and the post 120 of the sidewall 12 to which the side rail 40 is coupled is provided to accommodate the head of a fastener (not shown) received through an aperture 74 of a hinge assembly 60 that is coupled to the side rail 40. It should be understood, however, that the side rail 40 may be provided with an intermediate, vertical member which is not spaced-apart from the side rail 40 when coupled to the side rail 40. In such an example, the hinge assembly 60 may be welded and/or coupled to the side rail 40 through the use of an adhesive.

Figure 8:
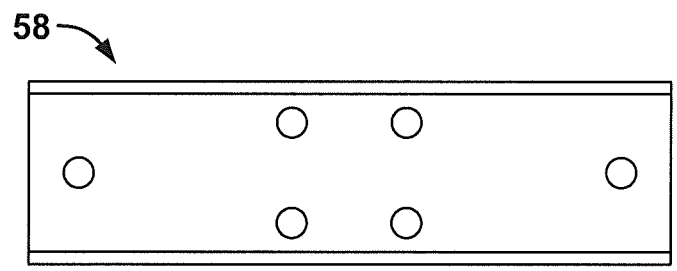
FIG. 8 is a side view of a splice channel of the side rail of the deck system.

The deck system 30 further includes a splice channel 58 shown in FIGS. 6 and 8. The illustrative splice channel 58 is coupled the side rail 40, as shown in FIG. 6 at locations where two portions of the side rail 40 abut each other. Each end of the abutting portions of the side rail 40 are coupled directly to the splice channel 58. Illustratively, the side rail 40 may include only a single rail portion which extends generally the entire length of the trailer. In such an embodiment, the use of the splice channel 58 is not necessary. Alternatively, the side rail 40 may include two or more side rail portions which each extend only partially along the length of the trailer 10. In this embodiment, one or more splice channels 58 may be used to couple abutting ends of adjacent side rail portions to each other.

Figure 3:
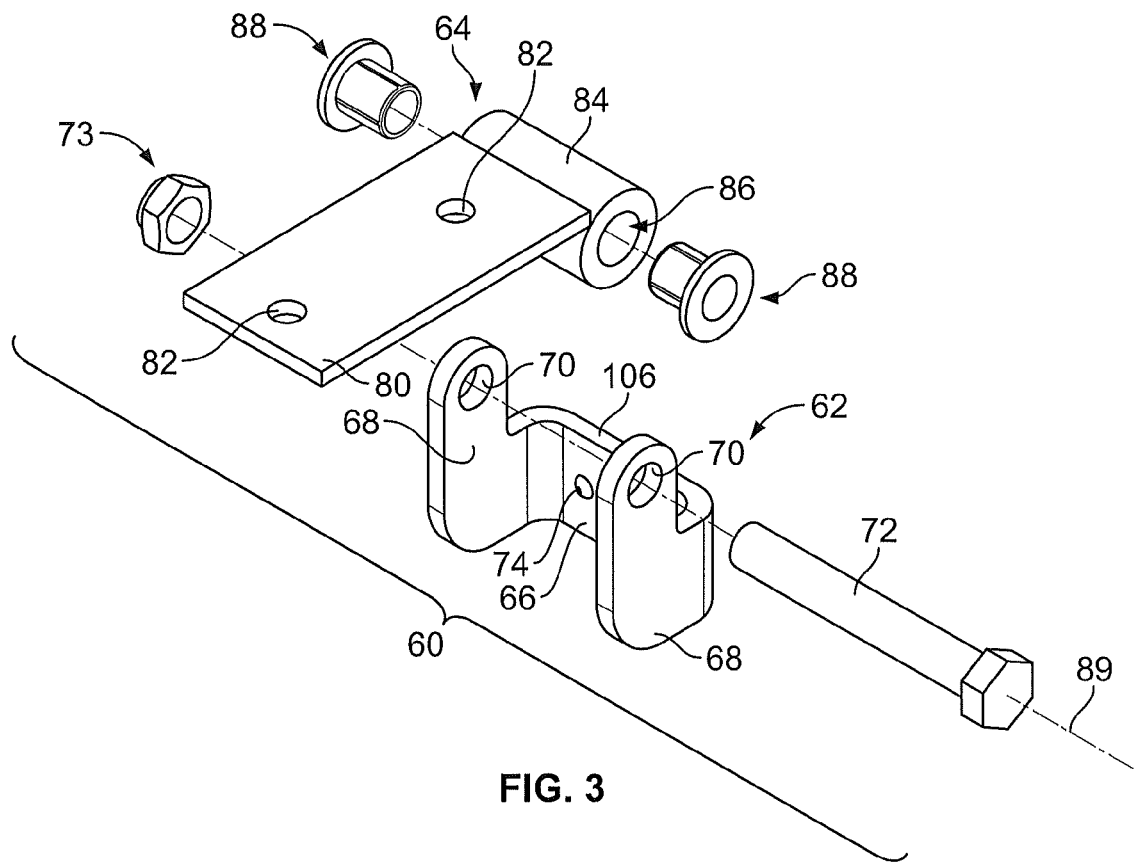
FIG. 3 is an exploded, perspective view of a hinge assembly of the deck system including a hinge butt portion and a hinge strap portion.

The deck system 30 further includes a hinge assembly 60, as shown in FIG. 3. The hinge assembly 60 includes a hinge butt portion 62 coupled to the side rail 40, as shown in FIGS. 5 and 6, as well as a hinge strap portion 64 coupled to one of the panels 42 of the deck system 30. Illustratively, the hinge assembly 60 as well as the side rail 40 is made from galvanized or zinc coated steel in order to prevent corrosion. However, it should be understood that the side rail 40 and the hinge assembly 60 may be made from any suitable material or materials including metals, metal alloys, and/or polymers, for example.

As is discussed in greater detail below, the hinge strap portion 64 is configured to pivot relative to the hinge butt portion 62 during movement of the deck system 30 between the stowed and use positions. As shown in FIGS. 3 and 6, the hinge butt portion 62 includes a horizontal body 66 and two upwardly-extending arms 68 coupled to each end of the horizontal body 66. Illustratively, the body 66 of the hinge butt portion 62 is generally C-shaped when viewed from above such that the arms 68 coupled to the body 66 are spaced-apart from the side rail 40 to which the hinge butt portion 62 is coupled. Accordingly, the first and second arms 68 of the hinge butt portion 62 are spaced-apart from the vertical member 48 of the side rail 40.

Each arm 68 of the hinge butt portion 62 includes an aperture 70 formed therein and configured to receive a pivot pin 72 therethrough. Illustratively, the body 66 of the hinge butt portion 62 is coupled to the intermediate member 48 of the side rail 40 via fasteners 76, such as rivets or bolts, for example, received through apertures 74 formed in the body 66. It should be understood that other suitable mechanical fasteners as well as adhesives and welds may be used in order to couple the hinge butt portion 62 to the side rail 40. As shown in FIG. 5, multiple hinge butt portions 62 are coupled to the side rail 40 in order to accommodate a plurality of panels 42.

Figure 4:
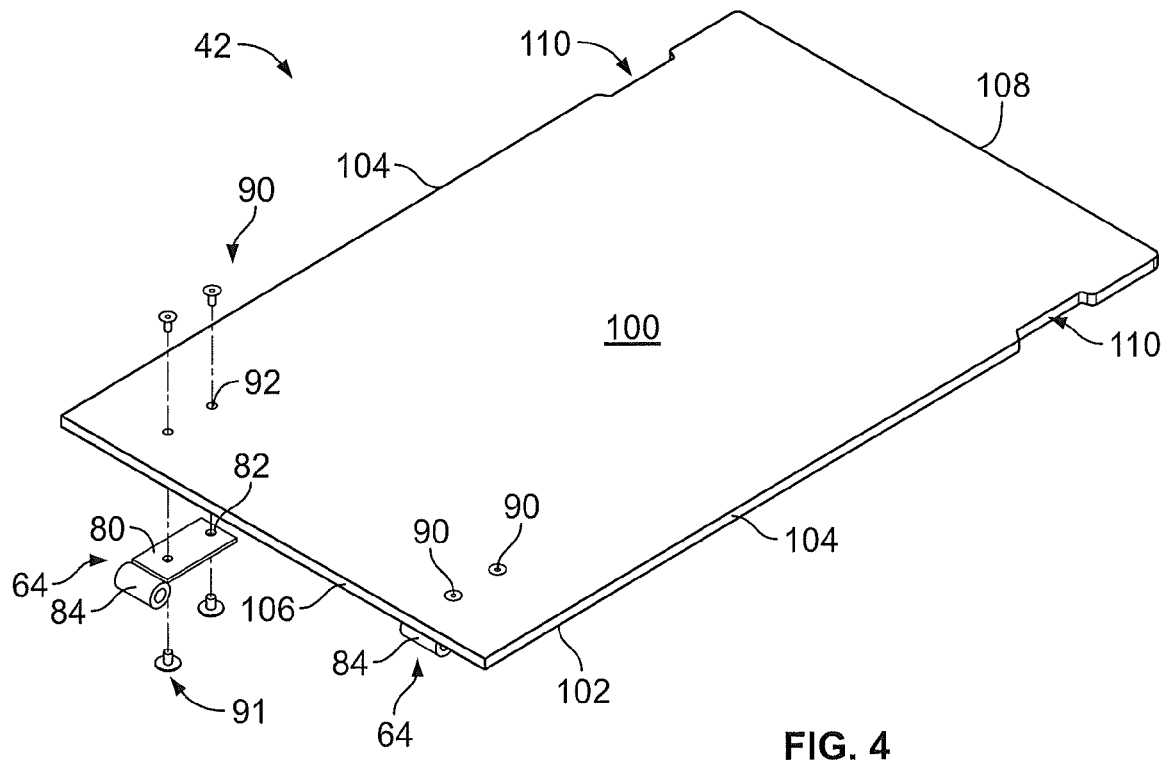
FIG. 4 is a perspective view of a panel of the deck system.

The hinge strap portion 64 is fixedly coupled to a panel 42, as shown in FIG. 4, and is pivotably coupled to the hinge butt portion 62 such that the hinge strap portion 62 pivots about the pivot pin 72 relative to the hinge butt portion 62. As shown in FIG. 3, the hinge strap portion 62 includes a hinge plate 80 having two illustrative apertures 82 formed therein. The hinge strap portion 62 further includes a cylindrically-shaped body 84 coupled to one end of the hinge plate 80 and defining a passageway 86 therethrough. Bearings 88 are received in either end of the cylindrical body 84. In use, the cylindrical body 84 is received between the arms 68 of the hinge butt portion 62 such that the apertures 70 of each arm 68 and the passageway 86 are generally aligned. The pivot pin 72 is received through the apertures 70 of each arm 68 and through the bearings 88 and the passageway 86 of the hinge strap portion 64 in order to pivotably couple the hinge strap portion 64 to the hinge butt 62. Illustratively, the pivot pin 72 is a bolt secured to the arms 68 of the hinge butt portion 62 with a nut 73, as shown in FIG. 3.

As shown in FIG. 4, two hinge strap portions 64 are coupled to a single panel 42 via fasteners 90, 91 received through the apertures 82 of each hinge plate 80 as well as corresponding apertures 92 formed in the panel 42. It should be understood that although two hinge strap portions 64 are coupled to each panel 42, any suitable number of hinge strap portions 64 may be coupled to each panel 42, depending upon, for example, the size of the panel 42. Illustratively, each panel 42 of the deck system 30 includes a top surface 100, a bottom surface 102, first and second side edges 104, an outer edge 106, and an inner edge 108. As shown in FIG. 4, the hinge plate 80 is coupled to the bottom surface 102 of the panel 42 near the outer edge 106 of the panel 42. Each panel 42 is generally rectangular in shape; however, the deck system 30 may include panels having other suitable shapes and sizes than the illustrative panel 42 shown in FIG. 4.

Illustratively, the first and second side edges 104 of each panel 42 each define a cut-out portion 110, as shown in FIG. 4. The cut-out portions 110 of each panel 42 cooperate to define an aperture 130 between adjacent panels 42 such that when the panels 42 are adjacent each other (in either the use position or the stowed position), a user may easily reach through the aperture 130 in order to grab the first or second side edge 104 of one of the panels 42 in order to move the panel 42 to or from the stowed position, for example. In other words, such apertures 130 operate to allow a user to grab the side edge 104 of a panel 42 in order to pivot that panel 42 upwardly or downwardly to or from the stowed position. Thus, in use, the cut-out portions 110 form hand holds, or locations within the otherwise adjacent and engaged side edges 104 of the panels 42 to allow a user to easily reach and grab ahold of the side edge 104 of a panel 42 and pivot the panel 42 upwardly or downwardly as needed. As such, the deck system 30 provides a continuous top and bottom surface 100, 102 except for one or more hand-held portions or apertures 110 between adjacent panels 42.

Illustratively, each panel 42 is made of a composite material. For example, the composite material may include a plastic core and metal outer skins coupled to the plastic core. Such a composite material provides a rigid, but lightweight and durable material. Illustratively, for example each panel 42 may be made of a DURAPLATE® composite panel provided by Wabash National Corporation of Lafayette, Ind. DURAPLATE® composite panels are constructed of a high-density polyethylene plastic core bonded between two high-strength steel skins. While the panels 42 are each made from the specific composite material described above, it should be understood that other suitable composite materials may be used as well. Further, the wall panels 42 may made be of any number of suitable, non-composite materials such as metals, metal alloys, and/or plastics, for example. Illustratively, the panels 42 of the present disclosure are each approximately 0.5 inch thick. The use of relatively thin panels, to create a relatively thin platform, operates to provide additional cubic feet of storage inside the storage area 32 of the trailer which may be used for the storage of additional cargo. While the particular panels 42 of the present disclosure are approximately 0.5 inch thick, it should be understood that the deck systems 30 disclosed herein may include panels which define other suitable thicknesses as well.

In use, the deck system 30 includes a plurality of panels 42 that are each movable between a generally vertical, stowed position shown in FIGS. 1 and 10 and a generally horizontal, use position shown in FIG. 2 (and in phantom in FIG. 10). Each panel 42 is coupled to the side rail 40 of the deck system 30 via two hinge assemblies 60. As discussed above, the hinge butt portion 62 of each hinge assembly 60 is fixedly coupled to the side rail 40 whereas the hinge strap portion 64 of each hinge assembly 60 is fixedly coupled to one of the panels 42 of the deck system 30 to allow the panels 42 to pivot relative to the side rail 40 about a pivot axis 89 defined by the pivot pin 72.

When in the stowed position, as shown in FIG. 2 as well as in phantom in FIG. 10, the top surface 100 of each panel 42 is adjacent to the inner surface 56 of the post 120 of the sidewall 12. In particular, the top surface 100 of each panel 42 is engaged with one or more posts 120 of the sidewall 12 when in the generally vertical, stowed position. While the particular sheet and post sidewall 12 (including the posts 120 and sheets 119) is disclosed herein, it should be understood that the deck system 30 may be used with a trailer including any suitable sidewall configuration. When the panels 42 are in the stowed position, the panels 42 are generally out of the way and do not extend into the interior storage space 32 of the trailer 10 and do not take up any significant amount of storage space 32 within the trailer 10. Further, when the panels 42 are in the stowed position, the cargo (not shown) for positioning below the side rail 40 of the deck system 30 may be loaded and unloaded into and out of the storage space 32 of the trailer 10.

Illustratively, as shown best in FIG. 10, when the panels 42 are in the stowed position, each panel 42 is positioned between the arms 68 of the hinge butt portion 62 and the innermost surface 56 of the post 120 as well as the side rail 40 or 140. The generally C-shaped body 66 of the hinge butt portion 62 operates to position the arms 68 of the hinge butt portion 62 away from the side rail 40 to provide room for the panel 42 between the sidewall 12 and the arm 68 when the panel 42 is in the stowed position. Further illustratively, the arms 68 of the hinge butt portion 62 are positioned below the bottom surface 102 of each respective panel 42 when the panel 42 is in the use position such that the pivot axis 89 about which each panel 42 pivots is also located below the panel 42 when the panel is in the use position. This position of the pivot axis 89 allows the outer edge 106 of the panel 42 to be positioned between the pivot axis 89 and both the side rail 40 of the deck system 30 and sidewall 12 of the trailer 10.

Illustratively, between the two hinge assemblies 60 of each panel 42, the deck assembly 30 includes a vertical channel 33 between an innermost surface 35 of the side rail and the pivot axis 89 of the hinge assembly 60 to allow debris which may accumulate on the top surface 100 of the panel 42 when the panel 42 is in the use position to fall through the channel 33 to a location below the side rail 40 or 140 when then panel 42 is in the stowed position. For example, any debris which may collect on the top surface 100 of each panel 42 during typical loading and unloading of cargo thereon falls down to the floor assembly 24 when the panels 42 are moved to the vertical, stowed position and does not generally collect on the side rail 40 or on any moving portion of the hinge assemblies 60 including the hinge strap portion 64 and the pivot pin 72 of the hinge butt portion 62. Thus, any debris which collects on the top surface 100 of the panels 42 is able to fall past the hinge assemblies 60 and to the floor assembly 24 when the panels 42 are raised to the stowed position and does not generally accumulate on the deck system 30, and particularly does not accumulate on the moving components of the hinge assembly 60 during use. Further, a top surface of each of the first and second arms 68 is vertically spaced-apart from a top surface 106 of the body 66 of the hinge butt portion 62.

Illustratively, in use, the panels 42 of the deck system 30 may be in the stowed position to allow a user to load cargo onto the floor assembly 24 of the trailer 10. Once the cargo loaded onto the trailer 10 generally fills the surface area of the floor assembly 24 and extends generally up to the height of the horizontally-extending side rail 40, a user may decide to move the deck system 30 to the use position by grabbing each panel 42 and pivoting each panel 42 downwardly toward the horizontal, use position shown in FIGS. 1 and 10. As noted above, the user may grab a panel 42 at the location of the cut-out portion 110 in order to move the panel 42 between the use and stowed positions. Illustratively, as noted above, the trailer 10 includes a right deck system 30 and a left deck system 30 such that each of the right and left deck systems 30 include panels 42 which, when in the use position, extend only partially across a width of the storage area 32 of the trailer 10. When each deck system 30 is in the use position, the panels 42 of each deck system 30 are supported near the inner edges 108 thereof by a conveyor system 121 coupled to the floor assembly 24 of the trailer.

As shown in FIGS. 1 and 2, the conveyor system 121 includes a horizontal table 122 supported by legs 124. The conveyor system 121 further includes a plurality of conveyor rollers 126 supported above the table 122 in order to move cargo from one end of the storage area 32 to another. Illustratively, the conveyor system 121 is positioned along a longitudinal centerline axis (not shown) of the trailer 10 such that the conveyor system 121 is generally equidistant from each of the right and left sidewalls 12 of the trailer 10. Accordingly, the panels 42 of each of the right and left deck systems 30 are generally the same height. However, it should be understood that the trailer 10 may include a deck assembly including deck systems having panels of differing heights such that the conveyor system 121 may be positioned closer to or farther from one of the sidewalls 12 of the trailer 10 in order to accommodate the panels 40 of each of the right and left deck systems 30. Illustratively, the conveyor system 121 further includes a pair of deck rails 125. Each deck rail 125 is coupled to the top surface of the table 122 on either end of the conveyor rollers 126, as shown in FIGS. 1 and 2. In use, the end portion adjacent the inner edge 108 of the bottom surface 102 of each panel 42 is supported on the deck rail 125.

Looking to FIG. 7, each illustrative deck rail 125 includes an upper, horizontal member 127 having a channel 129 formed therein. Illustratively, the channel 129 extends along a length of the deck rail 125. A deck bumper support 131 is received within the channel 129. The deck bumper support 131 is illustratively made from wood, but may be made from other suitable materials including, but not limited to, metals and/or polymers. The deck bumper support 131 is coupled to the horizontal member 127 via fasteners (not shown) such as self-tapping screws, for example. Illustratively, the deck bumper support 131 includes a channel 133 formed therein. The channel 133 extends along a length of the deck bumper support 131 and is configured to receive a deck bumper 135 therein. Illustratively, the deck bumper 135 is made of rubber, but may illustratively be made of another suitable material as well, including, but not limited to, wood, metal, and/or polymers, for example. The rubber deck bumper 135 provides a surface upon which the panels 42 are positioned when in the generally horizontal, use position as shown in FIG. 1.

When the panels 42 are in the use position, a top surface 100 of each panel is generally aligned with a top surface of each roller 126 of the conveyor system 121. Accordingly, cargo may be moved down the conveyor of rollers 126 from the rear of the trailer 10 to the front of the trailer 10 (or visa versa) and may be easily slid off the conveyor of rollers 126 and onto one or more panels 42 of the right and left deck systems 30. Illustratively, to accommodate a standard sized conveyor system 121, the thickness of the panels 42 generally determines the size of the deck bumper support 131 necessary such that the top surface of each roller 126 is aligned with the top surface 100 of each panel 42. Accordingly, depending upon the thickness of the panel 42, the thickness of the deck bumper support 131 may be smaller or larger. Furthermore, the deck bumper support 131 may not be necessary for panels of a certain thickness. It should be understood that while the particular conveyor system 121 is disclosed herein, any suitable conveyor system having any suitable height and width as well as any suitably-sized rollers may be provided.

Figure 9:
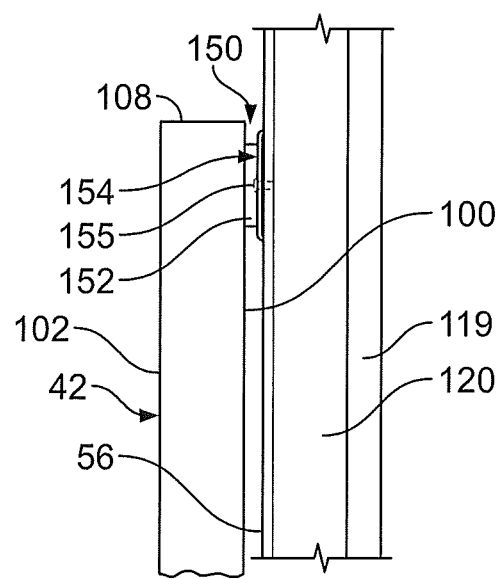
FIG. 9 is an end view of a portion of the panel in the vertical, stowed position and coupled to a post of the sidewall of the trailer.

When in the stowed position, the panels 42 are retained in a generally vertical position via a locking assembly 150, as shown in FIG. 9. The illustrative locking assembly 150 includes a magnet 152 coupled to various posts 120 of the sidewall 12 of the trailer 10. Because the outer sheets of each composite panel 42 are made from steel, the top surface 100 of each panel 42 is attracted to the magnets 152 and is retained by the magnets 152 in the generally vertical, use position. As illustratively shown in FIGS. 11 and 12, the locking assembly 150 also includes a hat section, or base plate, 154 configured to be received within a slot 156 of a front wall 158 the post 120. Illustratively, each post 120 includes opposite side walls 160 and a front wall 158 coupled to and extending between the side walls 160. The front wall 158 is spaced-apart from the sheets 119 of the sidewall 12 of the trailer 10 such that a channel is formed between the sheets 119 and the front wall 158 of the post 120.

The base plate 154 of the locking assembly 150 includes a base section 162 and an offset flange 164 at each end of the base section 162 such that the base section 162 is parallel to, but spaced-apart from, a plane created by the flanges 164. The base plate 154 includes an aperture 166 therethrough. The illustrative magnet 152 is generally cylindrical in shape and is a neodymium magnet. However, it should be understood that the magnet 152 may be any suitable shape and may be made of any magnetized material. The magnet 152 includes a base (not shown) coupled at its periphery to an outer shell 170. Six cylinders 172 are coupled to the base of the magnet 152 and placed concentrically about an aperture 174 through the base and located at the center of the base. Illustratively, the base, cylinders 172, and outer shell 170 are all made of the same magnetized material. However, it should be understood that various components of the magnet 152 may be made of other non-magnatized materials.

Figure 11:
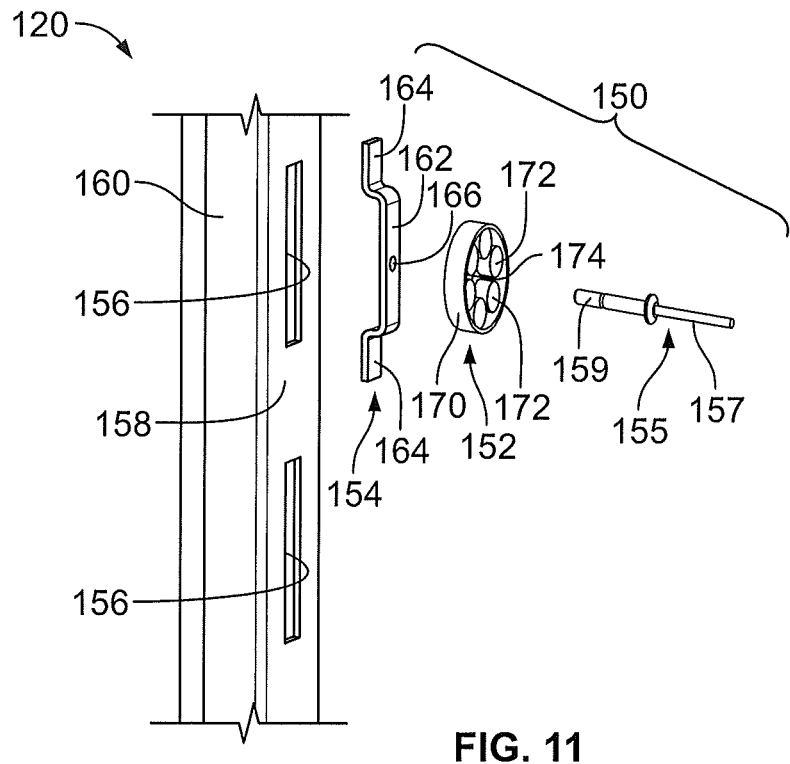
FIG. 11 is an exploded perspective view of a portion of a post of the sidewall of the trailer and a magnetic locking assembly configured to be coupled thereto in order to maintain a panel of the deck in the stowed position.

In use, the flanges 164 of the base plate 154 are received within one of the slots 156 of the post as shown in FIG. 11 such that the base section 162 of the base plate 154 is parallel the slot 156 while the flanges 164 are engaged with an inner surface (not shown) of the front wall 158 of the post 158. Illustratively, the base section 162 is received within the topmost slot 156 in the post 120 that will be covered by the panel 42 when the panel 42 is in the upright and stowed position, as shown in FIGS. 9 and 11. Once such a slot, or slots, 156 has been identified, the panel 42 may be placed back into the use, or horizontal, position in order to then position the base plate 154 within the identified slot 156. Illustratively, the base plate 154 may be properly placed by hand or through the use of a tool such as a bent pick tool, for example. Once the base plate 154 is properly placed within the slot 156, a zip-tie or pick tool, or other relatively thin workpiece, may be placed between the backside of the base plate 154 and the front wall 158 of the post 120 in order to hold the base plate 154 within the slot 156 until the base plate 154 is secured with the magnet 152 and a fastener 155.

Figure 12:
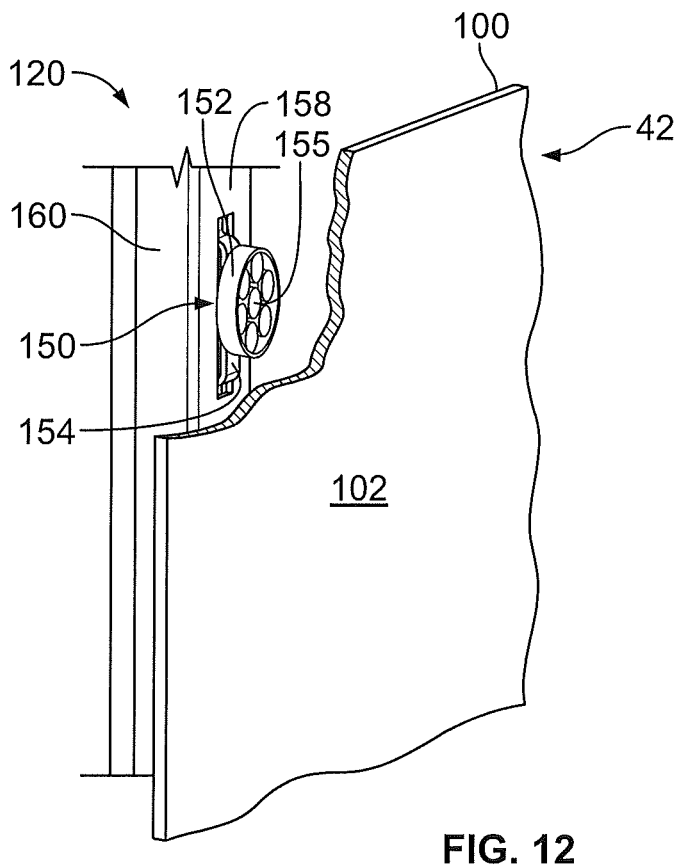
FIG. 12 is a perspective view of the magnetic locking assembly coupled to the post and showing the panel in the stowed position adjacent thereto.

The magnet 152 is secured to the base plate 154 using the fastener 155 such as the structural rivet shown in FIGS. 11 and 12. The fastener 155 is received through the aperture 174 of the magnet 152 and the aperture 166 of the base plate 154 in order to secure the magnet 152 to the post 120. Once the fastener 155 is properly placed through the apertures 174, 166 with the use of a tool (not shown), a pin portion 157 of the fastener 155 is broken away or otherwise removed while a rivet end 159 of the fastener 155 is swaged by the tool in order to hold the base plate 154 and magnet 152 together.

While the entire outer sheet of each composite panel 42 is made of steel, it should be understood that the top surface 100 of each panel may be made from any suitable material and may be made such that only a portion of the top surface 100 includes a ferrous metal such that the portion of the top surface 100 is retained by the magnets 152 when the panel 42 is in the stowed position. Further illustratively, the magnets 152 may be coupled to the posts 120 with or without the base plate 154 via any suitable fastener such as a rivet, bolt, screw, or other mechanical fastener. The magnets 152 may also be coupled to the posts 120 via an adhesive. It should also be understood that the locking assembly 150 used to retain the panels 42 in the generally vertical position may include any suitable mechanical device and attachment mechanism, such as tethers for example, in order to secure the panels 42 in the vertical position.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An interior deck system positioned within an interior storage area of a trailer comprising:
a side rail configured to be coupled to an inner surface of a sidewall of the trailer; and
first and second panels each hingedly coupled to the side rail,
wherein each of the first and second panels is movable between a generally vertical, stowed position and a generally horizontal, use position,
wherein the first and second panels each include first and second side edges such that the first side edge of the first panel is adjacent to and engaged with the second side edge of the second panel to define a generally continuous upper surface of the interior deck system when the first and second panels are each in the generally horizontal, use position, and
wherein the first side edge of the first panel includes a first cut-out portion formed therein to define an aperture between the first and second panels when the first and second panels are positioned parallel and adjacent each other in order to allow a user to grab ahold of either the first side edge of the first panel or the second side edge of the second panel.

2. The interior deck system of claim 1, wherein the second side edge of the second panel includes a second cut-out portion formed therein, and wherein the first and second cut-out portions are adjacent each other.

3. The interior deck system of claim 1, further comprising a first hinge assembly including a hinge butt portion coupled to the side rail and a hinge strap portion coupled to the first panel, wherein the first hinge assembly defines a pivot axis about which the first panel is pivoted between the stowed and use positions, and wherein the pivot axis is positioned below a bottom surface of the first panel when the first panel is in the use position.

4. The interior deck system of claim 1, wherein the hinge butt portion includes (i) a body coupled to a vertical surface of the side rail and (ii) first and second arms coupled to each end of the body such that the first and second arms are spaced-apart from each other.

5. The interior deck system of claim 4, wherein a top surface of each of the first and second arms is vertically spaced-apart from a top surface of the body.

6. The interior deck system of claim 4, wherein the body is generally C-shaped when viewed from above such that the first and second arms are spaced apart from the vertical surface of the side rail.

7. The interior deck system of claim 5, wherein an outer edge of the first panel is positioned between (i) the first and second arms of the hinge butt portion, and (ii) the sidewall of the trailer when the first panel is in the stowed position.

8. The interior deck system of claim 4, wherein the first and second panels are spaced-apart from the side rail when the first and second panels are in the use position.

9. The interior deck system of claim 1, further comprising a locking assembly configured to secure the panel in the generally vertical, stowed position.

10. The interior deck system of claim 9, wherein the locking assembly includes a magnet configured to be coupled to an interior surface of a sidewall of the trailer, and further wherein at least a portion of an upper surface of the panel includes a ferrous metal such that the portion of the upper surface of one of the first and second panels is retained by the magnet when the one of the first and second panels is in the stowed position.

11. The interior deck system of claim 10, wherein the magnet is configured to be spaced-apart from and positioned above the side rail.

12. The interior deck system of claim 1, wherein the first and second panels each include a plastic core and metal outer skins coupled to the plastic core.

13. An interior deck system positioned within an interior storage area of a trailer comprising:
- a side rail configured to be coupled to an inner surface of a sidewall of the trailer;
- a panel coupled to the side rail, the panel being movable between a generally vertical, stowed position and a generally horizontal, use position;
- a hinge assembly coupled to the panel and the side rail in order to allow the panel to pivot about a pivot axis between the stowed and use positions; and
- a vertical channel between an innermost surface of the side rail and the pivot axis to allow debris which may accumulate on a top surface of the panel when the panel is in the use position to fall through the channel to a location below the side rail when then panel is in the stowed position.

14. The interior deck system of claim 13, wherein a bottom surface of the panel is positioned between the pivot axis and the side rail when the panel is in the stowed position.

15. The interior deck system of claim 13, wherein the hinge assembly includes (i) a hinge butt portion coupled to the side rail and having an uppermost surface positioned below a bottom surface of the panel, and (ii) a hinge strap portion coupled to the bottom surface of the panel such that the pivot axis of the hinge assembly is positioned below the bottom surface of the panel when the panel is in the use position.

16. The interior deck system of claim 15, wherein the hinge butt portion includes (i) a body coupled to a vertical surface of the side rail and (ii) first and second arms coupled to each end of the body such that the first and second arms are spaced-apart from each other and from the vertical surface of side rail to which the body is coupled.

17. The interior deck system of claim 13, further comprising a locking assembly configured to secure the panel in the generally vertical, stowed position, wherein the locking assembly includes a magnet configured to be coupled to an interior surface of a sidewall of the trailer, and further wherein at least a portion of an upper surface of the panel includes a ferrous metal such that the portion of the upper surface of the panel is retained by the magnet when the panel is in the stowed position.

18. The interior deck system of claim 13, wherein the panel is a first panel, and further comprising a second panel coupled to the side rail and positioned adjacent the first panel, wherein the second panel is also movable between the generally vertical, stowed position and the generally horizontal, use position, and further wherein an aperture is located between adjacent panels to allow a user grab a side edge of the first and second panel when the first and second panels are in the stowed position.

19. An interior deck system positioned within an interior storage area of a trailer comprising:
- a side rail configured to be coupled to an inner surface of a sidewall of the trailer;
- a panel coupled to the side rail, the panel being movable between a generally vertical, stowed position and a generally horizontal, use position; and
- a hinge assembly including a hinge butt portion coupled to the side rail and a hinge strap portion coupled to the panel, wherein the hinge assembly defines a pivot axis about which the panel is pivoted between the stowed and use positions, and wherein the pivot axis is positioned below a bottom surface of the panel when the panel is in the use position.

* * * * *